J. M. CARTER.

AUTOMATIC RETAINER FOR AIR BRAKES.

APPLICATION FILED JULY 3, 1913.

Reissued July 14, 1914.

13,771.

2 SHEETS—SHEET 1.

WITNESSES

R. A. Balderson

Jesse B. Keller

INVENTOR

J. M. Carter, by Bakewell, Byman & Parmelee,

Attys.

THE NORRIS PETERS CO., WASHINGTON, D. C.

J. M. CARTER.

AUTOMATIC RETAINER FOR AIR BRAKES.

APPLICATION FILED JULY 3, 1913.

Reissued July 14, 1914.

13,771.

2 SHEETS—SHEET 2.

WITNESSES

R. A. Balderson

Jesse B. Heller

INVENTOR

J. M. Carter, by Bakewell, Byrnes & Parmelee.

Attys

THE NORRIS PETERS CO., WASHINGTON, D. C.

UNITED STATES PATENT OFFICE.

JOHN M. CARTER, OF MEMPHIS, TENNESSEE, ASSIGNOR OF ONE-HALF TO ASA C. HENRY, OF MEMPHIS, TENNESSEE.

AUTOMATIC RETAINER FOR AIR-BRAKES.

13,771. Specification of Reissued Letters Patent. Reissued July 14, 1914.

Original No. 996,748, dated July 4, 1911, Serial No. 577,579. Application for reissue filed July 3, 1913. Serial No. 777,360.

*To all whom it may concern:*

Be it known that I, JOHN M. CARTER, a citizen of the United States, residing at Memphis, in the county of Shelby and State of Tennessee, have invented certain new and useful Improvements in Automatic Retainers for Air-Brakes; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in automatic retainer apparatus for air brakes and the object in view is to generally improve upon and render more efficient the form of apparatus embodied in my Patent 916,669 of March 30, 1909.

More specifically the features of the present invention consist in means for graduating the pressure from fifty pounds to twenty and only consuming fifty seconds of time in its operation and a proportionate length of time in lighter applications.

My invention comprises various other details of construction and combinations and arrangements of parts which will be hereinafter fully described and then specifically defined in the appended claims.

Figure 1:
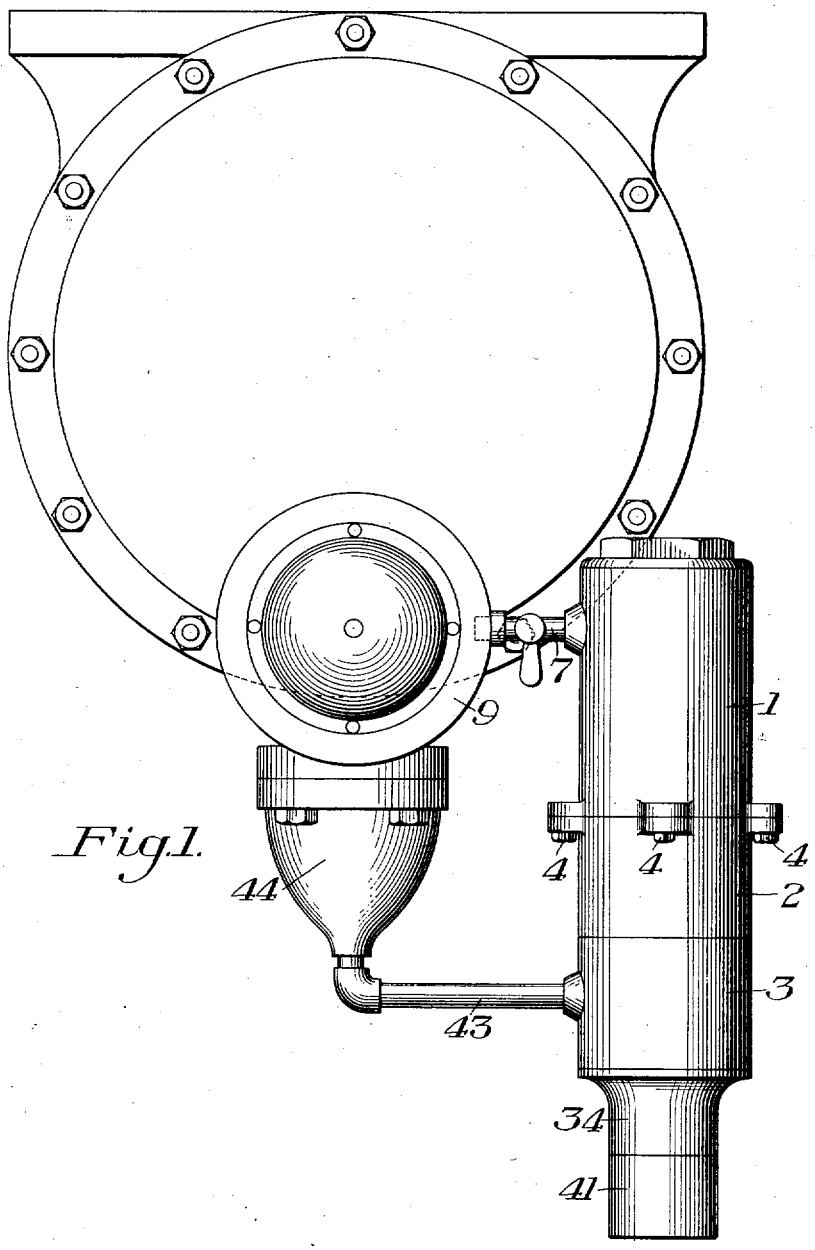
Figure 2:
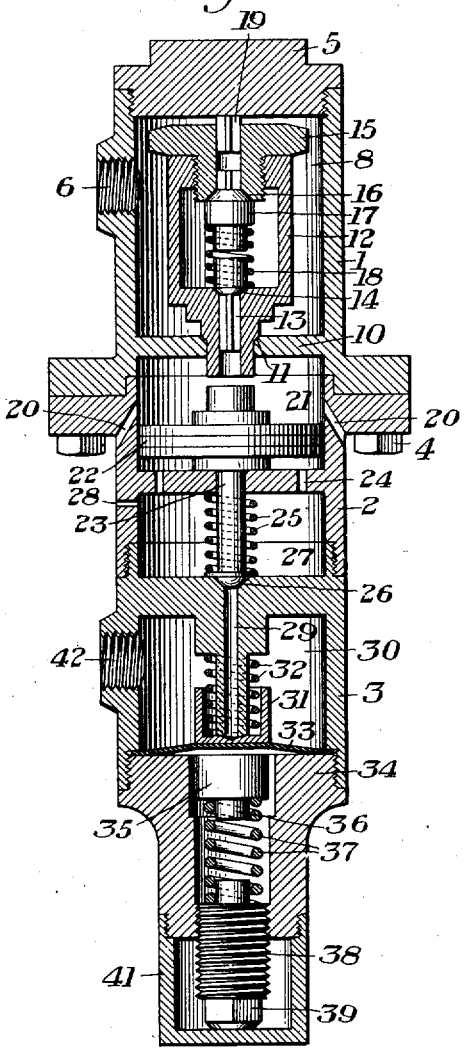
Figure 3:
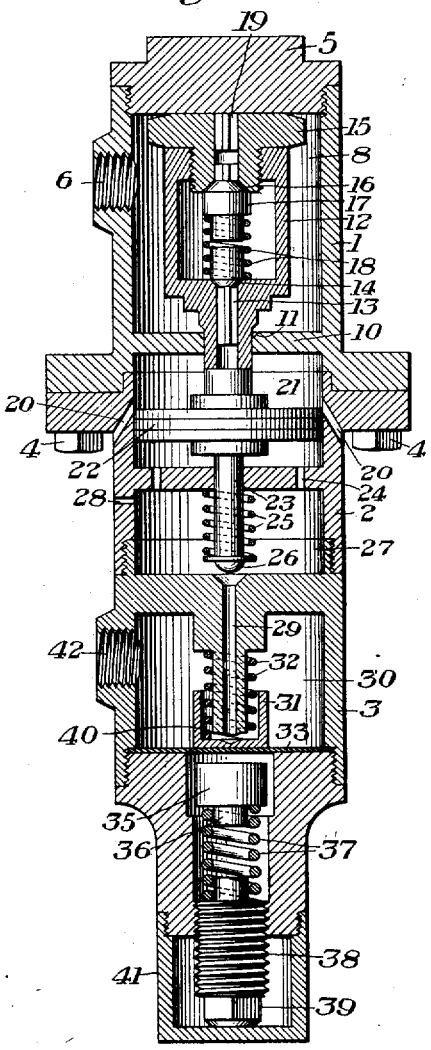

I illustrate my invention in the accompanying drawings, in which:

Figure 1 is an end view of a brake cylinder and triple valve casing connected therewith. Fig. 2 is a central longitudinal sectional view through the apparatus, showing the valve seated; and Fig. 3 is a similar view showing the valve open.

Reference now being had to the details of the drawings by numerals, 1, 2 and 3 designate respectively the sections of the valve casing containing the operative parts of the apparatus, the two former being held together by means of bolts or lag screws 4, while the section 3 has threaded connection with the part 2. The section 1 has a threaded plug 5 having an angular outlined wrench receiving portion, forming means whereby it may be conveniently screwed into the section and removed therefrom. Said section 1 has a threaded opening 6 to receive a pipe 7 forming a means of communication between the chamber 8 within the section 1 and the exhaust port of a triple valve contained within the casing 9. Said section 1 has a partition 10 in its lower end which is centrally apertured with a bevel about the marginal edge of said opening, forming a seat 11 for a weighted valve 12, which is contained within the chamber 8 and which valve at its lower end below the seat 11 is preferably triangular in cross section and hollow for the reception of the valve stem 13 which is also angular in cross section below the beveled valve seat 14 and which is provided with a graduating groove for the purpose of allowing air under pressure to escape gradually, as will be hereinafter fully described.

The weighted valve 12 has a threaded cap 15, having a central opening leading therethrough, the marginal edge of said opening at its lower end being beveled, forming a seat 16 for the valve 17. Said valve 17 is normally held seated by means of the coiled spring 18 bearing against the valve. Projecting from the plug cap 5 is a guide stem 19, angular in cross section and adapted to guide the weighted valve 12, which is seated normally by its own weight, excepting when a release is desired as will be hereinafter explained. The intermediate section 2 of the valve casing is provided with two exhaust ports 20 in the upper portion thereof and forming a communication between the chamber 21 and the atmosphere. Mounted within the chamber 21 is a piston 22 which is made up of rings, followers, etc., of the usual construction, and which piston is provided with a stem 23 projecting through a perforated partition 24 formed within said central section. Said stem 23 has a coiled spring 25 thereabout, held in position by means of a cap nut 26, the upper end of the spring bearing against the partition 24 and which spring 25 serves to normally hold the piston 22 seated and free from the weighted valve 12 above, while the brake pressure is being retained.

Mounted within the chamber 27 immediately below said partition 24 and within the section 2 of the casing is a small relief port 28 for excessive pressure. The lower section 3 of the casing is provided with a hollow valve stem 29 which is in communication with the chamber 30. Said stem 29 is provided with a valve cap 31 within which a coiled spring 32 is mounted which passes about the valve stem 29 and rests on a shoulder provided for its reception on the upper end of the stem. A diaphragm 33 is fitted at the bottom of the chamber 30 and is slightly arched and extends over the shoulders provided for its reception and which are formed in the wall of the section 3 and said diaphragm is firmly held in place by means of the cap 34 which has threaded connection with the section 3 adapted to clamp and hold the diaphragm against said shoulder. Said cap 34 is hollow its entire length and is fitted with a plunger 35 which has a tapering portion to receive a contracted portion 36 adapted to receive a coiled spring 37 and in the lower portion of the cavity of the cap 34 is a threaded plug 38 through which plug 38 a bolt 39 passes, the end of which projects through the plug and over which one end of the spring 37 engages, the cap 31 resting against the diaphragm to hold the valve 40 against its seat. Said cap 34 is provided with a projecting member 41 which extends over the adjusting plug 38 without coming in contact therewith, thereby protecting the parts from dust, etc. The chamber 30 within the section 3 has communication through the threaded opening 42 and pipe 43 with the triple valve casing 44.

The operation of my invention will be readily understood and is as follows:—Assuming the train line to be connected to the section 3 by a pipe leading from the lower part of the triple valve casing 44, the pressure of the train line will pass into the chamber 30. The regular train line pressure being about seventy pounds, the valve cap 31 will remain seated through the medium of the spring 32 which will require from seventy-three to seventy-five pounds to actuate the same, thereby preventing any movement of the valves under normal train line pressure of seventy pounds. The exhaust port of the triple valve being connected with the chamber 8 through the pipe 7 is connected by a two-way cut-out valve by means of which the retainer may be cut out of the service if so desired. It will be understood that it will not be necessary to cut out the retainers, as the engineer will have full control of them at all times and can use the retaining feature or he can brake in the usual way and not use the retaining feature, if desired, by putting the brake valve in full release position when a full release of the brakes is desired. In order to obtain the advantages of the retaining feature and have full charge of the air at all times, the engineer may make an application of the brakes in the usual manner by drawing from the train line with the usual engineer's brake valve sufficient air to make the desired brake cylinder pressure, usually from 10 to 20 pounds, the latter pressure being a full service application. The engineer's valve is then returned to running position. This action reseats the triple valve and the process of recharging the auxiliaries will begin and, were it not for my retainers, the brakes would release. With the retainers in use, the air from the brake cylinder enters the chamber 8 where it is retained by the weighted valve 12 being seated, excepting that the excess pressure over 20 pounds will pass through the opening in the cap nut 15 and out through the graduating grooves in the valve stem 13 to the atmosphere. Said graduated groove is so arranged that it will take a full service application (or 50 pounds brake cylinder pressure) fifty seconds to become reduced to 20 pounds and, after 20 pounds brake cylinder pressure is reached, the coiled spring 18 will force the valve 17 to its seat in the cap nut 15 thereby closing all openings to the atmosphere and retaining a pressure of 20 pounds and which pressure may be retained as long as desired or released immediately after an application has been made. By placing the engineer's valve in full release position, the train line pressure, which is in communication with the chamber 30, will be raised to from 73 to 75 pounds almost instantly and which pressure will cause the diaphragm 33 to act and the coiled spring 32 to lift the cap 31 from its seat, thus allowing the train line pressure to pass through the hollow valve stem 29 into the chamber 27 to the perforated partition 24 in the chamber 21 and underneath the piston 22, forcing the latter against the stem of the weighted valve 12, lifting the latter from its seat and thereby allowing a quick and complete release of the brake pressure through exhaust port 6 of chamber 8, out through the opening regulated by the valve 12 into the chamber 21, thence to the atmosphere through the ports 20. By this method, the engineer may retain his brakes set for any desired period and have auxiliary reservoirs and train line fully charged at the same time.

The relief port 28 will prevent overcharging of the auxiliary reservoir since it provides an escape from the train pipe to the atmosphere when the cap 31 is unseated by excess train pipe pressure.

From the foregoing description when taken in connection with the drawings, it will be noted that the operation of my retainer willl be purely automatic and will not require the services of train men to turn up or down the handle of the retainer, but places the control absolutely within the hand of the engineer.

I claim:

1. In combination with the brake cylinder and triple valve of an air-brake system, an automatic retainer casing made up of communicating sections, a weighted valve controlling the communication between two of the sections, a spring-pressed graduating valve positioned within said weighted valve and regulating a passageway through the latter, a pipe communicating between one of said sections and the check valve casing of the triple valve, a pipe communicating between one of the other sections and exhaust port of the triple valve, said valves in the casing adapted to be actuated automatically by the engineer's brake valve, substantially as described.

2. In combination with the brake cylinder and triple valve of an air brake system, an automatic retainer casing made up of communicating sections, a hollow weighted valve regulating communication between two of the chambered sections, a spring-pressed valve within the chambered valve and regulating the passage therethrough, a second valve within the weighted valve and regulating a passageway between the interior of the hollow valve and the chamber in which the same is positioned, a piston mounted in one of said sections and having a stem movable through an aperture in a perforated partition in the section in which it is located, a spring adapted to hold said piston seated, the chambered portion in which said spring is positioned having a vent duct to the atmosphere, the casing in which the weighted valve is positioned having a port adapted to communicate with the exhaust port of the triple valve, and one of the sections having a port communicating with the triple valve casing, substantially as described.

3. In combination with the brake cylinder and triple valve of an air-brake system, an automatic retainer casing made up of communicating sections, a hollow weighted valve regulating communication between two of the chambered sections, a spring-pressed valve within the chambered valve and regulating the passage therethrough, a second valve within the weighted valve and regulating a passageway between the interior of the hollow valve and the chamber in which the same is positioned, a piston mounted in one of said sections and having a stem movable through an aperture in a perforated partition in the section in which it is located, a cap nut upon said stem, a spring interposed between the same and said perforated partition, the chamber in which said spring is mounted having a vent forming an exit to the atmosphere for an excess of compressed air, thereby allowing said spring to hold the piston seated, substantially as described.

4. In combination with the brake cylinder and triple valve of an air-brake system, an automatic retainer casing made up of communicating sections, a hollow weighted valve regulating communication between two of the chambered sections, a spring-pressed valve within the chambered valve and regulating the passage therethrough, a second valve within the weighted valve and regulating a passageway between the interior of the hollow valve and the chamber in which the same is positioned, a piston mounted in one of said sections and having a stem movable through an aperture in a perforated partition of the section in which it is located, a cap nut upon said stem, a spring interposed between the same and said perforated partition, the chamber in which said spring is mounted having a vent forming an exit to the atmosphere for an excess of compressed air, thereby allowing said spring to hold the piston seated, a hollow valve stem mounted in and communicating with a chambered section of the casing and connected to the cylinder containing said piston, a valve cap fixed to said hollow stem, a spring bearing against said cap, a diaphragm, a cap fitted to the section containing said hollow piston stem, a spring-pressed plunger bearing against said diaphragm, the casing containing the weighted valve having a port adapted to communicate with the exhaust port of the triple valve, and the section containing said diaphragm provided with a port designed to communicate with the triple valve casing, substantially as described.

5. In combination with the brake cylinder and triple valve of an air brake system, an automatic retainer casing made up of communicating sections, a hollow weighted valve regulating communication between two of the chambered sections, a spring-pressed valve within the chambered valve and regulating the passage therethrough, a second valve within the weighted valve and regulating a passageway between the interior of the hollow valve and the chamber in which the same is positioned, a piston mounted in one of said sections and having a stem movable through an aperture in a perforated partition of the section in which it is located, a cap nut upon said stem, a spring interposed between the same and said perforated partition, the chamber in which said spring is mounted having a vent forming an exit to the atmosphere for an excess of compressed air, thereby allowing said spring to hold the piston seated, a hollow valve stem mounted on and communicating with the chambered section of the casing and connected to the cylinder containing said piston, a valve cap fixed to said hollow stem, a spring bearing against said cap, a diaphragm, a cap fitted to the section containing said hollow piston stem, a spring-pressed plunger bearing against said diaphragm, a threaded plug fitted within the cap carrying said plunger, the casing containing the weighted valve having a port adapted to communicate with the exhaust port of the triple valve, and the section containing said diaphragm provided with a port designed to communicate with the triple valve casing; substantially as described.

6. In combination with the brake cylinder and triple valve of an air brake system, a valve retaining casing made up of three chambered sections, one of said sections having a perforated partition, a hollow weighted valve regulating the aperture in the partition communicating with the chamber divided by said perforated partition, a piston mounted in one of the chambers of the section having the perforated partition, a stem of said piston passing through the latter, a spring holding said piston seated, the chamber in which said spring is positioned having a vent to the atmosphere, a hollow valve stem, a valve cap fitted to said hollow stem, a diaphragm against which said cap stem is adapted to bear, a cap having threaded connection with the section in which said diaphragm is mounted, an adjustable spring-pressed plunger mounted within said cap and bearing against said diaphragm, the casing containing the weighted valve having a port adapted to communicate with the exhaust port of the triple valve, and the section containing said diaphragm provided with a port designed to communicate with the triple valve casing; substantially as described.

7. The combination with a brake cylinder, triple valve and auxiliary air reservoir of an air-brake system, of a retainer connected to the brake cylinder to receive the exhaust therefrom, a valve for controlling the escape of air from said retainer, means under the control of the engineer for controlling the opening of said valve, and automatic means for limiting overcharging of the auxiliary reservoir; substantially as described.

8. The combination with a brake cylinder, triple valve, and auxiliary air reservoir of an air-brake system of a retainer connected to the brake cylinder to receive the exhaust therefrom, a valve for controlling the escape of air from said retainer, and means under the control of the engineer for controlling the opening of said valve, said retainer having an escape opening in communication with the atmosphere which is automatically opened when the pressure in the train pipe becomes excessive on re-charging; substantially as described.

9. The combination with a brake cylinder, triple valve and auxiliary air reservoir of an air-brake system, of a retainer connected to the brake cylinder to receive the exhaust therefrom, a valve for controlling the escape of air from said retainer, means under the control of the engineer for controlling the opening of said valve, and an escape port connected to the train pipe and which is automatically opened to the atmosphere when the pressure in the train pipe becomes excessive in re-charging; substantially as described.

In testimony whereof, I have hereunto set my hand.

JOHN M. CARTER.

In the presence of—
H. M. Corwin,
Geo. H. Parmelee.

Copies of this patent may be obtained for five cents each, by addressing the "Commissioner of Patents, Washington, D. C."